(12) United States Patent
Fleischman et al.

(10) Patent No.: US 11,709,681 B2
(45) Date of Patent: Jul. 25, 2023

(54) DIFFERENTIAL PIPELINE DELAYS IN A COPROCESSOR

(71) Applicant: ADVANCED MICRO DEVICES, INC., Santa Clara, CA (US)

(72) Inventors: Jay Fleischman, Fort Collins, CO (US); Michael Estlick, Fort Collins, CO (US); Michael Christopher Sedmak, Fort Collins, CO (US); Erik Swanson, Fort Collins, CO (US); Sneha V. Desai, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 105 days.

(21) Appl. No.: 15/837,974

(22) Filed: Dec. 11, 2017

(65) Prior Publication Data

US 2019/0179643 A1  Jun. 13, 2019

(51) Int. Cl.
*G06F 9/38* (2018.01)

(52) U.S. Cl.
CPC .......... *G06F 9/3867* (2013.01); *G06F 9/3836* (2013.01)

(58) Field of Classification Search
CPC .................................................... G06F 9/3867
See application file for complete search history.

(56) References Cited

U.S. PATENT DOCUMENTS

| | | | |
|---|---|---|---|
| 5,511,181 A * | 4/1996 | Baxter | G06F 9/3869 712/E9.063 |
| 5,604,912 A | 2/1997 | Iadonato et al. | |
| 5,748,515 A | 5/1998 | Glass et al. | |
| 5,903,772 A | 5/1999 | White et al. | |
| 6,101,621 A * | 8/2000 | Kondo | G06F 9/3867 714/724 |
| 6,343,356 B1 | 1/2002 | Pechanek et al. | |
| 6,463,525 B1 | 10/2002 | Prabhu | |
| 6,609,209 B1 | 8/2003 | Tiwari et al. | |
| 7,209,482 B1 | 4/2007 | Rahim | |
| 9,389,833 B2 | 7/2016 | Pawlowski | |
| 2009/0177870 A1 * | 7/2009 | Fleischer | G06F 9/3826 712/223 |
| 2013/0007415 A1 * | 1/2013 | Babayan | G06F 9/3016 712/205 |

(Continued)

OTHER PUBLICATIONS

Non-Final Office Action dated Sep. 4, 2019 for U.S. Appl. No. 15/837,918, 25 pages.

(Continued)

*Primary Examiner* — Michael J Metzger

(57) ABSTRACT

A coprocessor such as a floating-point unit includes a pipeline that is partitioned into a first portion and a second portion. A controller is configured to provide control signals to the first portion and the second portion of the pipeline. A first physical distance traversed by control signals propagating from the controller to the first portion of the pipeline is shorter than a second physical distance traversed by control signals propagating from the controller to the second portion of the pipeline. A scheduler is configured to cause a physical register file to provide a first subset of bits of an instruction to the first portion at a first time. The physical register file provides a second subset of the bits of the instruction to the second portion at a second time subsequent to the first time.

20 Claims, 7 Drawing Sheets

(56) References Cited

U.S. PATENT DOCUMENTS

| | | |
|---|---|---|
| 2013/0290681 A1 | 10/2013 | Keller et al. |
| 2014/0115301 A1* | 4/2014 | Sanghai .............. G06F 9/30065 |
| | | 712/220 |
| 2014/0129804 A1 | 5/2014 | King |
| 2014/0181477 A1* | 6/2014 | Vaidya ................ G06F 9/30181 |
| | | 712/208 |
| 2014/0229710 A1 | 8/2014 | Muff et al. |
| 2015/0010124 A1 | 1/2015 | Gupta et al. |
| 2015/0381476 A1* | 12/2015 | Oshima ................... H04L 45/28 |
| | | 370/219 |
| 2016/0092221 A1 | 3/2016 | Stempel et al. |
| 2016/0342192 A1 | 11/2016 | Shearer et al. |
| 2017/0221550 A1 | 8/2017 | Diril et al. |
| 2018/0129475 A1 | 5/2018 | Almagambetov et al. |
| 2018/0136869 A1 | 5/2018 | Mola |
| 2018/0165199 A1* | 6/2018 | Brandt ................. G06F 12/0831 |
| 2018/0321938 A1 | 11/2018 | Boswell et al. |
| 2019/0101952 A1 | 4/2019 | Diamond et al. |
| 2019/0227807 A1 | 7/2019 | Martin et al. |

OTHER PUBLICATIONS

U.S. Appl. No. 15/837,918, filed Dec. 11, 2017 in the name of Jay Fleischman et al., 29 pages.

Final Office Action dated Mar. 11, 2020 for U.S. Appl. No. 15/837,918, 41 pages.

Kondo, Masaaki, et al., "A Small, Fast and Low-Power Register File by Bit-Partitioning", IEEE, Proceedings of the 11th International Symposium on High-Performance Computer Architecture, 2005, 10 pages.

Non-Final Office Action for U.S. Appl. No. 15/837,918 dated Jan. 26, 2021, 37 pages.

Final Rejection dated Aug. 2, 2021 for U.S. Appl. No. 15/837,918, 19 page.

Non-Final Office Action dated Jan. 6, 2022 for U.S. Appl. No. 15/837,918, 11 pages.

Final Office Action dated Apr. 22, 2022 for U.S. Appl. No. 15/837,918, 14 pages.

Notice of Allowance dated Sep. 16, 2022 for U.S. Appl. No. 15/837,918, 28 pages.

* cited by examiner

DIFFERENTIAL PIPELINE DELAYS IN A COPROCESSOR

BACKGROUND

Processing systems often include coprocessors such as floating-point units (FPUs) to supplement the functions of a primary processor such as a central processing unit (CPU). For example, an FPU executes mathematical operations such as addition, subtraction, multiplication, division, other floating-point instructions including transcendental operations, bitwise operations, and the like. A conventional instruction set architecture for coprocessors supports instructions that have a width of 128 bits. Some processing systems support extensions to the instruction set architecture that support an instruction width of 256 bits. For example, the AVX/AVX2 instruction set operates on registers that are 256 bits wide, which are referred to as YMM registers. Physical constraints make it difficult to pick and control all 256 bits in the same cycle. For example, the area needed to provide additional data paths for the 256 bits increases signal propagation delays, while higher-speed designs provide less cycle time to convey the signals.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
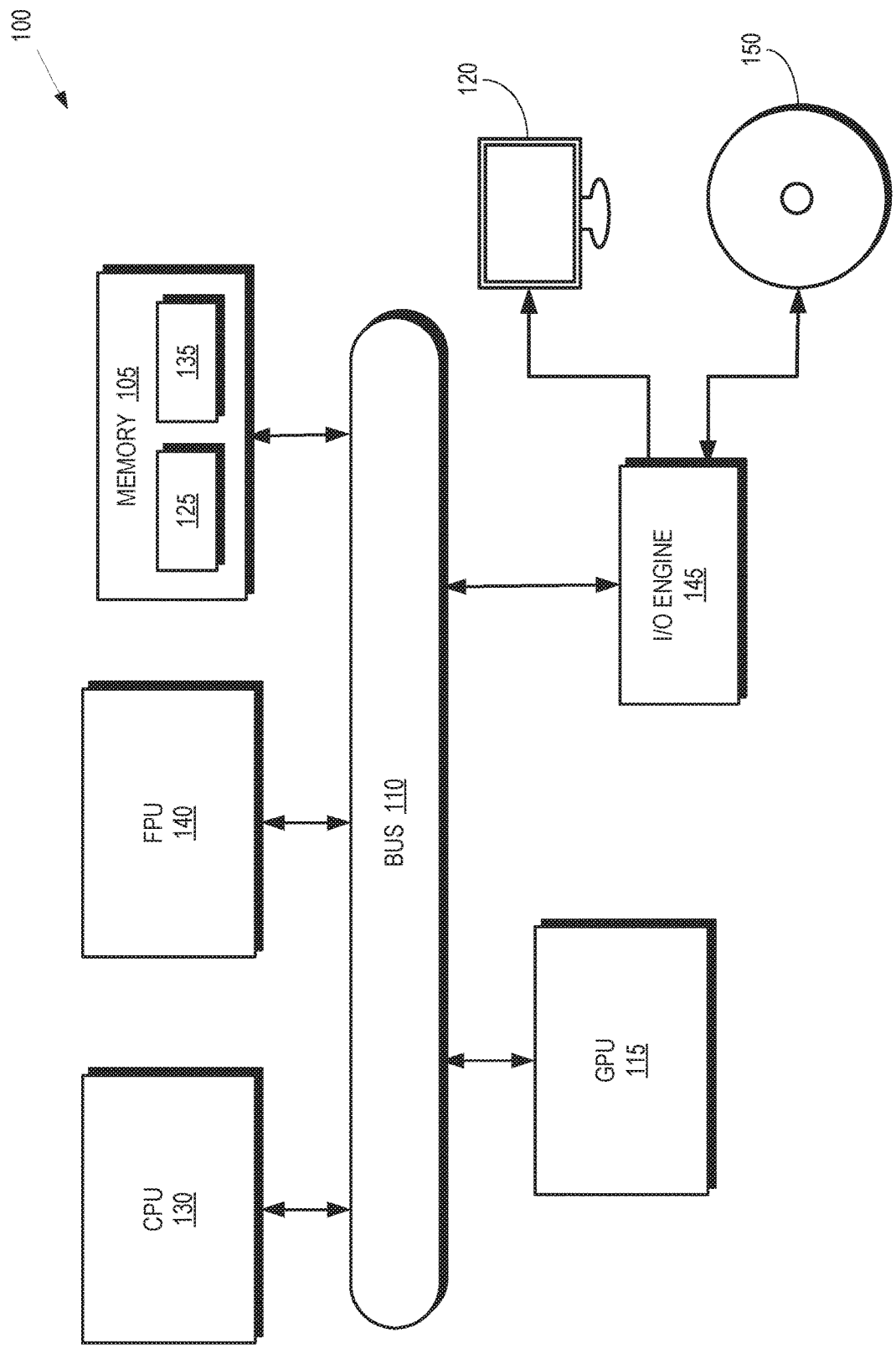
FIG. 1 is a block diagram of a processing system according to some embodiments.

Native 256 bit operations (or wider bit widths) are implemented in a coprocessor that provides a first portion of bits of a first operation to a first portion of a pipeline for execution during a first cycle and provides a second portion of the bits of the first operation to a second portion of the pipeline for execution during a second (subsequent) cycle. In some embodiments, a scheduler dispatches the first portion of the bits from a physical register file to the first portion of the pipeline and dispatches the second portion of the bits from the physical register file to the second portion of the pipeline. A physical distance traversed by a signal propagating from a controller to the first portion of the pipeline is shorter than a physical distance traversed by a signal propagating from the controller to the second portion of the pipeline. Some embodiments of the scheduler therefore provide a set of control signals for the lower 128 bits of the instruction (e.g., the least significant bits) to lanes of the pipeline that are physically closer to the controller and provide a separate set of control signals for the upper 128 bits (e.g., the most significant bits) of the instruction to lanes that are physically more distant from the controller. The scheduler delays the second portion of the control signals relative to the first portion to account for propagation delays between the controller and the more distant lanes of the pipeline. Some embodiments of the scheduler dispatch the upper 128 bits to the pipeline with a one cycle delay to provide time for control signaling associated with the upper 128 bits to reach the more distant lanes of the pipeline. Instructions that do not cross lanes (which includes most floating-point instructions) are therefore issued on average once per cycle with a single cycle latency. A subset of the instruction set that does cross lanes (such as broadcast instructions that copy a value in one lane to all other lanes) require a three cycle latency to communicate information between the upper 128 bits and the lower 128 bits.

Some embodiments of the coprocessor handle multiple instruction set architectures that map instructions to the 256 bits in different ways. For example, the coprocessor is configurable to handle the AVX128 instruction set, the AVX256 instruction set, and the SSE instruction set. The AVX256 instruction set uses all 256 bits to represent the instructions in the set. The AVX128 instruction set uses only the lower 128 bits to represent instructions and sets the upper 128 bits equal to zero. The SSE instruction set uses only the lower 128 bits to represent instructions and leaves the upper 128 bits equal to whatever value they previously held, e.g., the current value of the 256 bits is merged with a previous value of the upper 128 bits of a previous destination register. A problem arises because some 128 bit instructions exhibit modal behavior and produce different results depending on whether the upper 128 bits are set equal to zero or merged with a previous value. To address this problem, the same micro-operations are defined for the different instruction sets and then the micro-operations are tagged with different values to indicate the different modes. For example, the same micro-operation is used to perform addition and the addition operation is tagged to indicate the instruction set architecture that provided the addition instruction. A tag value of 00 indicates that the micro-operation uses the lower 128 bits and sets the upper 128 bits to zero, a tag value of 01 indicates that the micro-operation uses all 256 bits, and a tag value of 11 indicates that the micro-operation uses the lower 128 bits and a merged value of the upper 128 bits.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, in some cases, the memory 105 is implemented using other types of memory including static random access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 renders objects to produce values of pixels that are provided to the display 120, which uses the pixel values to display an image that represents the rendered objects. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 executes instructions such as program code 135 stored in the memory 105 and the CPU 130 stores information in the memory 105 such as the results of the executed instructions. The CPU 130 is also able to initiate graphics processing by issuing draw calls to the GPU 115.

The processing system 100 further includes one or more co-processing units such as a floating-point unit (FPU) 140 that is configured to carry out operations on floating point numbers. Some embodiments of the FPU 140 perform operations including addition, subtraction, multiplication, division, square root, and bit shifting or broadcasting, as well as transcendental functions such as exponential functions, trigonometric functions, and the like. The FPU 140 supports operation of the GPU 115 and the CPU 130. For example, if the CPU 130 encounters an instruction that requires performing a floating-point operation, the CPU 130 transmits a request to the FPU 140, which carries out the operation and returns the results to the CPU 130. Although the FPU 140 shown in FIG. 1 is implemented externally to the GPU 115 and the CPU 130, some embodiments of the FPU 140 are integrated into one or more other processing units.

The FPU 140 is configured to operate on instructions that include a relatively large number of bits, e.g., on 256 bit instructions. The physical devices (such as transistors) that are used to implement lanes of one or more pipelines that process the instructions in the FPU 140 are therefore distributed over a relatively large area. The lines or traces that are used to convey control signaling to the lanes of the pipelines introduce propagation delays that differ significantly between different lanes of the pipelines. For example, a propagation delay between a lane that is disposed relatively close to the controller is shorter than a propagation delay between a lane that is disposed relatively far from the controller. The difference in propagation delays is on the order of one cycle or longer, depending on the number of bits in the instruction and the corresponding number of lanes in the pipelines.

The pipelines in the FPU 140 are therefore subdivided into multiple portions based on a physical distance between the portions and a controller. In some embodiments, the pipelines are each partitioned into a first portion and a second portion. For example, in a 256 bit instruction processor, the first portion handles a lower 128 bits of the instruction and the second portion handles the upper 128 bits of the instruction. A controller in the FPU 140 is configured to provide control signals to the first portion and the second portion of the pipelines. A first physical distance traversed by control signals propagating from the controller to the first portion is shorter than a second physical distance traversed by control signals propagating from the controller to the second portion. A scheduler in the FPU 140 is configured to provide a first subset of bits of the instruction to the first portion at a first time and a second subset of the bits of the instruction to the second portion at a second time subsequent to the first time. Some embodiments of the scheduler delay provision of the second subset of the bits to the second portion by one cycle of execution of the pipelines.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 is able to communicate with the memory 105, the GPU 115, or the CPU 130. In the illustrated embodiment, the I/O engine 145 is configured to read information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

Figure 2:
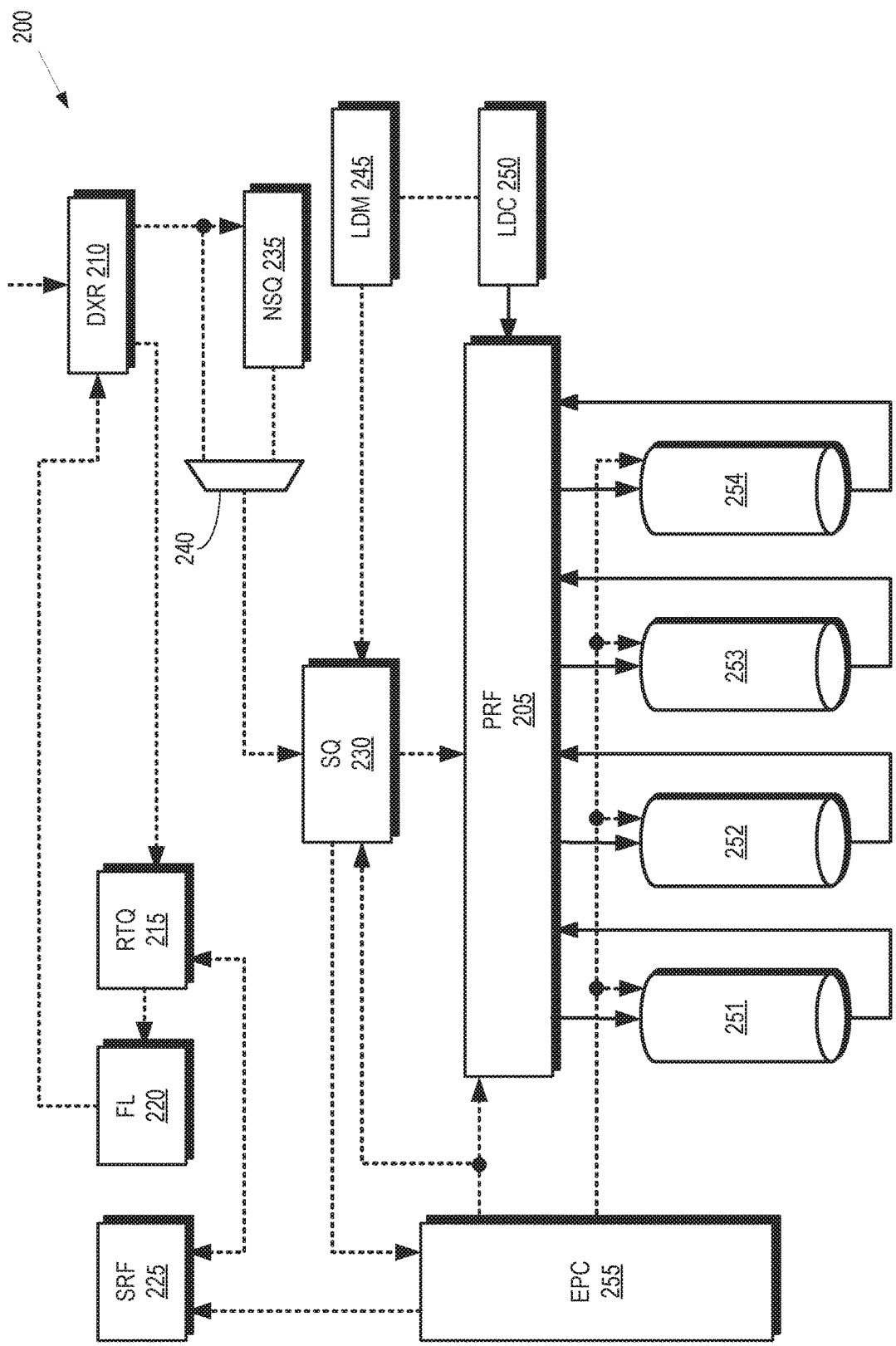
FIG. 2 is a block diagram of a floating-point unit (FPU) according to some embodiments.

FIG. 2 is a block diagram of an FPU 200 according to some embodiments. The FPU 200 is used to implement some embodiments of the FPU 140 shown in FIG. 1. The FPU 200 includes a set of physical register files 205 that are used to store instructions, operands used by the instructions, and results of executed instructions. Entries in the physical register files 205 are indicated by physical register numbers. In some embodiments, the physical register numbers are mapped (or renamed) to architectural register numbers that are defined by an instruction set architecture.

A decode, translate, rename block (DXR) 210 receives instructions that are to be executed by the FPU 200. The DXR 210 is configured to decode the instructions, perform address translations, and perform register renaming for instructions, as necessary. The DXR 210 is also connected to a retire queue (RTQ) 215 that stores instructions until they are retired. Writing the result of an instruction back to the physical register file 205 is referred to as retiring the instruction. A free list (FL) 220 maintains a list of the register numbers of the free registers in the physical register file 205, e.g., physical register numbers that are freed by retirement of instructions. A status register file (SRF) 225 includes information indicating the status of registers.

A scheduler (SQ) 230 is configured to schedule instructions for execution in the FPU 200. The DXR 210 provides decoded instructions to the scheduler 230. The DXR 210 is also connected to a non-pick scheduler queue (NSQ) 235 that queues instructions prior to being picked for execution by the scheduler 230. The NSQ 235 provides the queued instructions to the scheduler 230 for dispatch and execution. A multiplexer 240 is used to select between instructions provided by the DXR 210 and the NSQ 235. A load map block (LDM) 245 and a load convert block (LDC) 250 are used to load operands from memory or cache into the physical register file 205. The scheduler 230 stores pending instructions until their operands are available in the physical register file 205, e.g., until the load map block 245 and the load convert block 250 have provided the necessary operands to the physical register file 205.

The FPU 200 implements four pipelines 251, 252, 253, 254 (collectively referred to herein as "the pipelines 251-254") that are configured to execute floating-point instructions that the scheduler 230 dispatches from the physical register file 205 to the pipeline. For example, the pipelines 251-254 are each able to execute a 256 bit floating-point instruction that is received from the physical register file 205. Results of the instructions that are executed by the pipelines 251-254 are returned to the physical register file 205. The pipelines 251-254 process instruction in multiple stages (not shown in the interest of clarity) that include reading instructions, decoding instructions, executing instructions, and writing results of executing any instructions back to the physical register file 205.

A controller (EPC) 255 provides control signaling for exception and pipe control. Control signaling paths (e.g., as implemented using control buses) in FIG. 2 are indicated by dotted lines and data paths are indicated by solid lines. The controller 255 is disposed further from some lanes of the pipelines 251-254 than from other lanes of the pipelines 251-254. For example, the controller 255 is disposed closer to lanes of the pipeline 251 that are used to process the lower 128 bits of a 256 bit instruction and further from lanes of the pipeline 251 that are used to process the upper 128 bits of the 256 bit instruction. Consequently, control signals generated by the controller 255 take less time to propagate from the controller 255 to closer lanes of the pipelines 251-254 (e.g., those that process the lower 128 bits) and more time to propagate from the controller 255 to more distant lanes of the pipelines 251-254 (e.g. those that process the upper 128 bits).

In order to compensate for the additional propagation time required for control signals to reach more distant lanes of the pipelines 251-254, the scheduler 230 is configured to insert a delay between the dispatch times for different portions of instructions that are scheduled for execution on the pipelines 251-254. The delays between the portions of the instructions are determined based on propagation times between the controller 255 and different portions of the pipelines 251-254. Subsets of the bits of an instruction that are to be processed by lanes that are closer to the controller 255 are scheduled and dispatched to the pipelines 251-254 before subsets of the bits of the instruction that are to be processed by lanes that are further from the controller 255.

Some embodiments of the scheduler 230 schedule a first subset of bits of an instruction for dispatch to a first portion of the lanes of the pipelines 251-254 at a first time and a second subset of the bits of the instruction to a second portion of the lanes of the pipelines 251-254 at a second time subsequent to the first time. For example, the scheduler 230 schedules the lower 128 bits of an instruction for dispatch to the pipeline 251 during a first cycle and schedules the upper 128 bits of the instruction for dispatch to the pipeline 251 during a second cycle that is the next cycle after the first cycle. The one cycle delay between dispatch of the upper 128 bits and the lower 128 bits allows the corresponding control signaling to reach the lanes that process the subsets of the bits. Wider pipelines can also be accommodated by this approach. For example, the scheduler 230 can schedule a first 128 bits of a 512-bit instruction for dispatch during a first cycle, a second 128 bits of the 512-bit instruction for dispatch during a second cycle, a third 128 bits of the 512-bit instruction for dispatch during a third cycle, and a fourth 128 bits of the 512 bit instruction for dispatch during a fourth cycle.

Figure 3:
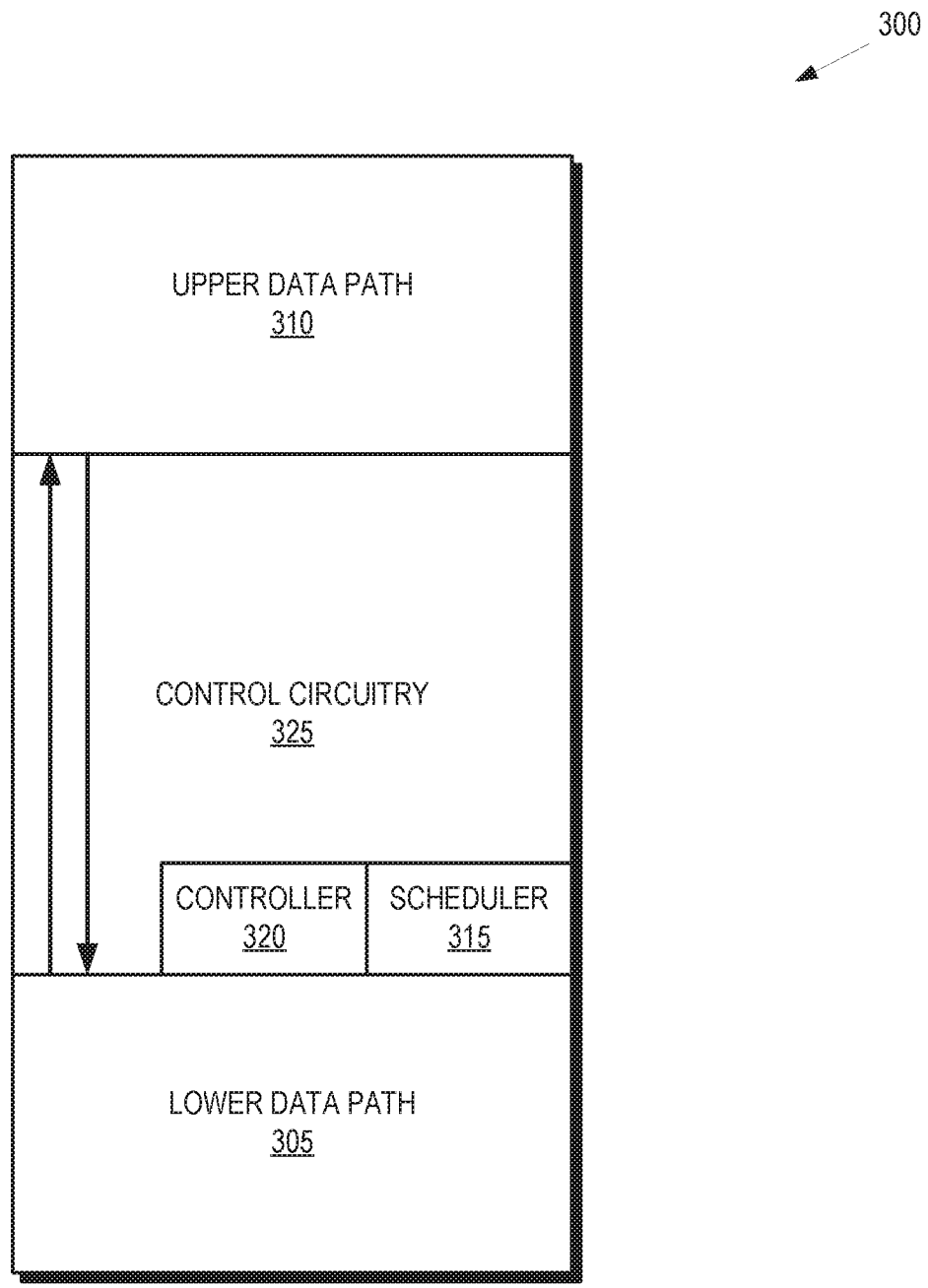
FIG. 3 is a block diagram of a pipeline according to some embodiments.

FIG. 3 is a block diagram of a floorplan of a pipeline 300 according to some embodiments. The pipeline 300 is used to implement some embodiments of the pipelines 251-254 shown in FIG. 2. The pipeline 300 includes a lower data path 305 and an upper data path 310. Some embodiments of the pipeline 300 support 256 bit instructions, in which case the lower data path 305 is configured to process the lower 128 bits of the 256 bit instruction and the upper data path 310 is configured to process the upper 128 bits of the 256 bit instruction. The pipeline 300 also includes a scheduler 315 to schedule instructions for execution in lower data path 305 and the upper data path 310. The pipeline 300 further includes a controller 320 to generate control signals that are provided to the lower data path 305 and the upper data path 310 via control circuitry 325.

In the illustrated embodiment, the lower data path 305 is physically closer to the scheduler 315 and the controller 320. The upper data path 310 is physically further from the scheduler 315 and the controller 320. Consequently, control signaling generated at either the scheduler 315 or the controller 320 takes longer to propagate from the scheduler 315 or the controller 320 to the upper data path 310 than it takes the control signaling to propagate from the scheduler 315 or the controller 320 to the lower data path 305. For example, control signaling generated by the controller 320 is provided to the lower data path 305 via the control circuitry 325 along a path that is physically shorter and requires less propagation time than a path from the controller 320 to the upper data path 310 via the control circuitry 325. The scheduler 315 therefore schedules execution of an upper portion of an instruction by the upper data path 310 one or more cycles after execution of a lower portion of the instruction is scheduled for execution by the lower data path 305.

Figure 4:
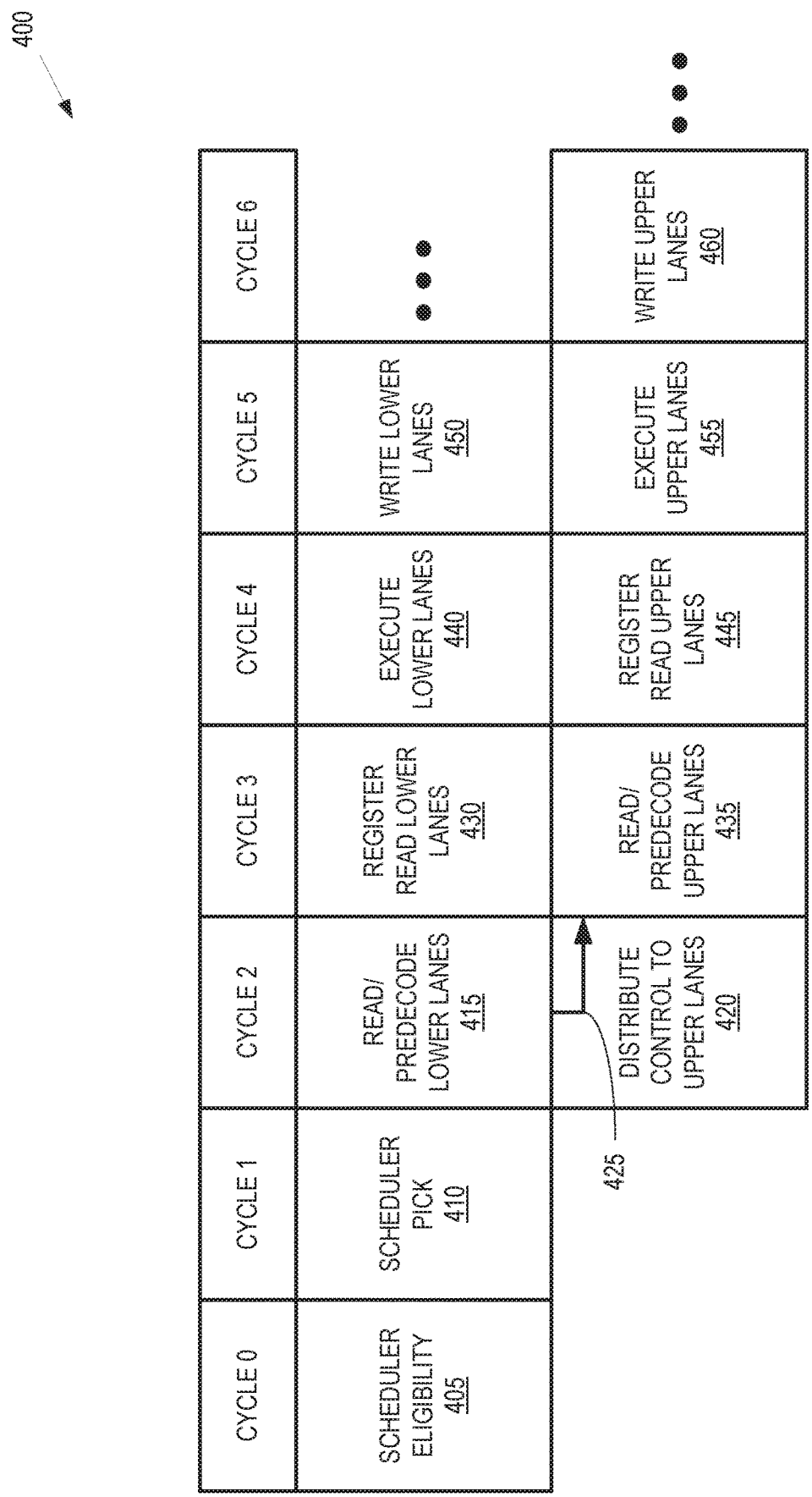
FIG. 4 is a block diagram illustrating differential processing of subsets of an instruction in lower and upper lanes of a pipeline according to some embodiments.

FIG. 4 is a block diagram illustrating differential processing 400 of subsets of an instruction in lower and upper lanes of a pipeline according to some embodiments. Differential processing 400 is performed in some embodiments of the pipelines 251-254 shown in FIG. 2 and the pipeline 300 shown in FIG. 3. The pipeline is divided into lower lanes that are closer to a controller that provides control signaling to the pipeline and upper lanes that are further from the controller. Control signaling takes longer to propagate to the upper lanes than to the lower lanes. Instructions processed in the pipeline are therefore subdivided into lower bits and upper bits that are provided to the lower lanes and upper lanes, respectively. The differential processing 400 is performed in a sequence of cycles and, in the interest of clarity, the cycles are labeled cycles 0-6.

At cycle 0, a scheduler determines (in block 405) that the instruction is eligible to be scheduled for execution on the pipeline.

At cycle 1, the scheduler picks (in block 410) the instruction for execution in the pipeline and dispatches the instruction to the pipeline.

At cycle 2, the lower lanes of the pipeline read the lower bits of the instruction from the physical register and perform a predecode operation on the lower bits of the instruction (in block 415). Control is also distributed to the upper lanes (in block 420), as indicated by control signaling 425. The control signaling 425 is used to initiate processing of the upper bits of the instruction in the upper lanes of the pipeline.

At cycle 3, the lower lanes of the pipeline perform a register read (in block 430) to read information that is used to execute the lower bits of the instruction. The upper lanes of the pipeline read the upper bits of the instruction from the physical register and perform a predecode operation on the upper bits of the instruction (in block 435).

At cycle 4, the lower lanes of the pipeline execute (in block 440) the lower bits of the instruction. The upper lanes of the pipeline perform a register read (in block 445) to read information that is used to execute the upper bits of the instruction.

At cycle 5, the lower lanes of the pipeline write (at block 450) the results of executing the lower bits of the instruction, e.g., back to the physical register file. The upper lanes of the pipeline execute (in block 455) the upper bits of the instruction.

At cycle 6, the upper lanes of the pipeline write (at block 460) the results of executing the upper bits of the instruction, e.g., back to the physical register file. Although not shown in FIG. 4, the lower lanes of the pipeline are able to begin processing of lower bits of a subsequent instruction in cycle 6.

The embodiment shown in FIG. 4 is an example of single cycle operation of a pipeline with no transfer of information between the lower lanes and the upper lanes. In some cases, the scheduler picks another single cycle operation in cycle 2 that is dependent on the instruction that was picked in cycle 1. The upper lanes consume and produce one cycle behind the lower lanes, so the dependencies line up and picking the subsequent single cycle operation does not introduce any additional hazard. The pipeline is therefore able to process instructions on average once per cycle with a single cycle latency.

Figure 5:
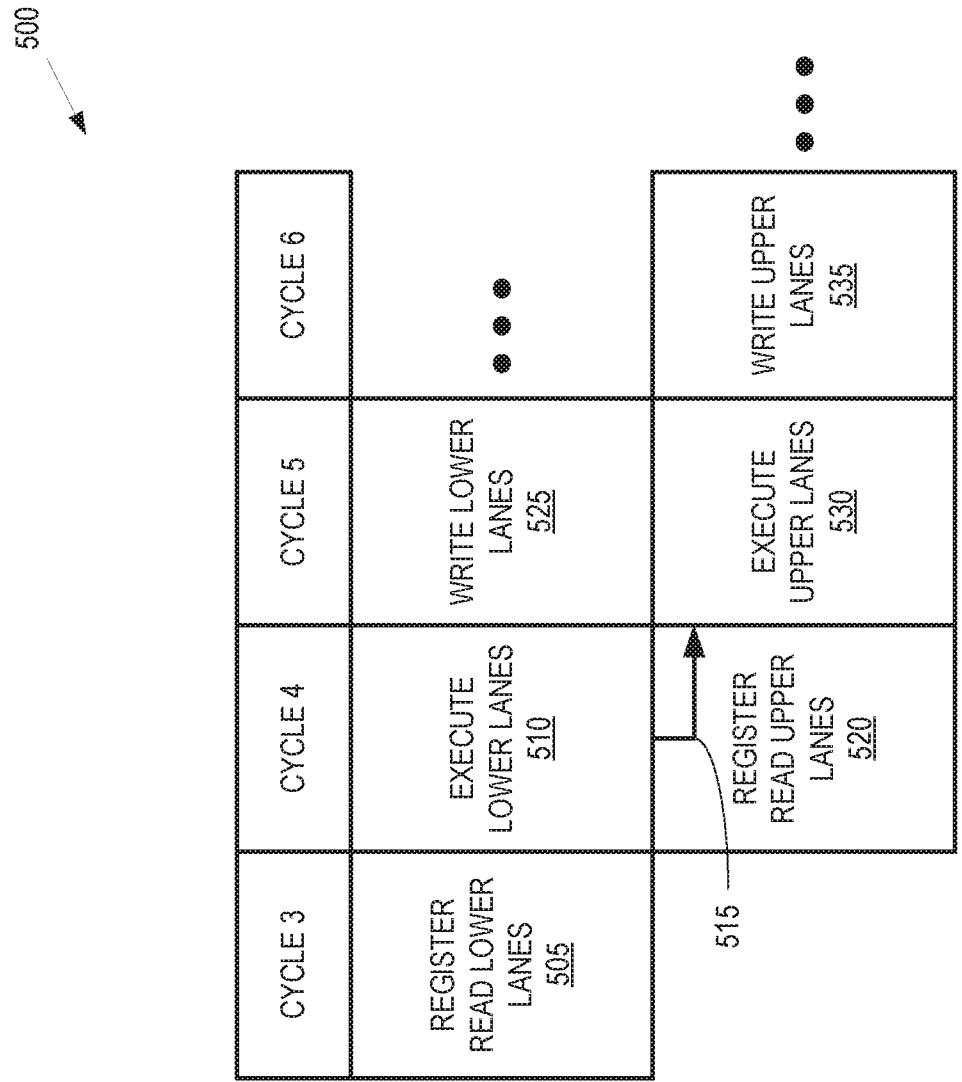
FIG. 5 is a block diagram illustrating a single cycle transfer of data from lower lanes of a pipeline to upper lanes of a pipeline during differential processing of an instruction according to some embodiments.

FIG. 5 is a block diagram illustrating a single cycle transfer 500 of data from lower lanes of a pipeline to upper lanes of a pipeline during differential processing of an instruction according to some embodiments. The single cycle transfer 500 is performed in some embodiments of the pipelines 251-254 shown in FIG. 2 and the pipeline 300 shown in FIG. 3. The pipeline is divided into lower lanes that are closer to a controller that provides control signaling to the pipeline and upper lanes that are further from the controller. Control signaling takes longer to propagate to the upper lanes than to the lower lanes. Instructions processed in the pipeline are therefore subdivided into lower bits and upper bits that are provided to the lower lanes and upper lanes, respectively. The single cycle transfer 500 is performed in a sequence of cycles that corresponds to some embodiments of the differential processing 400 shown in FIG. 4. Thus, in the interest of clarity, the cycles are labeled cycles 3-6.

At cycle 3, the lower lanes of the pipeline perform a register read (in block 505) to read information that is used to execute the lower bits of the instruction. Although not shown in FIG. 5, the upper lanes of the pipeline read the upper bits of the instruction from the physical register and perform a predecode operation on the upper bits of the instruction.

At cycle 4, the lower lanes of the pipeline execute (in block 510) the lower bits of the instruction. The executed lower bits of the instruction include an operation that distributes information from the lower lanes to the upper lanes. Examples of instructions that distribute information include broadcast instructions, shift instructions, and the like. The information is distributed from the lower lanes to the upper lanes during cycle 4, as indicated by the arrow 515. The upper lanes of the pipeline perform a register read (in block 520) to read information that is used to execute the upper bits of the instruction.

At cycle 5, the lower lanes of the pipeline write (at block 525) the results of executing the lower bits of the instruction, e.g., back to the physical register file. The upper lanes of the pipeline execute (in block 530) the upper bits of the instruction. The upper lanes of the pipeline have access to the data that was distributed from the lower lanes and therefore the upper lanes are able to complete execution during cycle 5. Thus, distribution of data from the lower lanes to the upper lanes is a single cycle operation.

At cycle 6, the upper lanes of the pipeline write (at block 535) the results of executing the upper bits of the instruction, e.g., back to the physical register file. Although not shown in FIG. 5, the lower lanes of the pipeline are able to begin processing of lower bits of a subsequent instruction in cycle 6.

Figure 6:
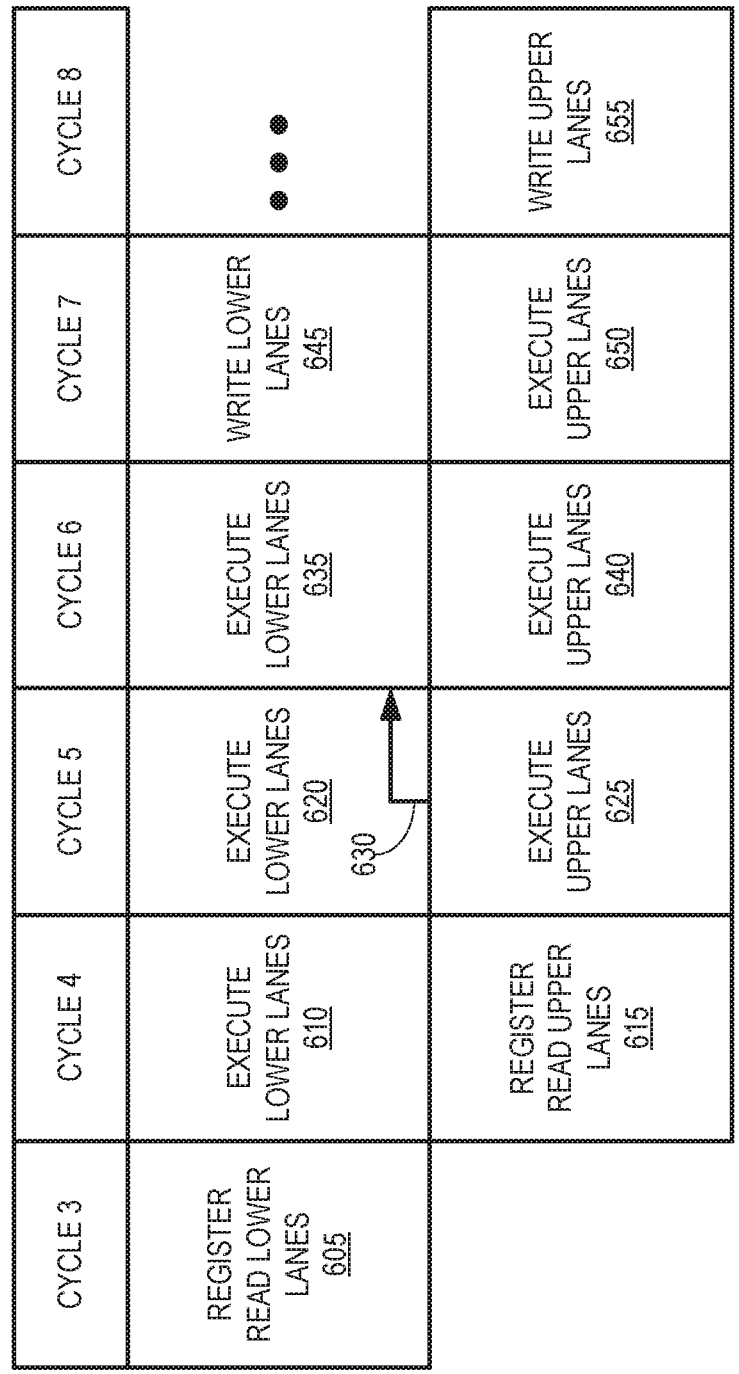
FIG. 6 is a block diagram illustrating a three cycle transfer of data from upper lanes of a pipeline to lower lanes of a pipeline during differential processing of an instruction according to some embodiments.

FIG. 6 is a block diagram illustrating a three cycle transfer 600 of data from upper lanes of a pipeline to lower lanes of a pipeline during differential processing of an instruction according to some embodiments. The three cycle transfer 600 is performed in some embodiments of the pipelines 251-254 shown in FIG. 2 and the pipeline 300 shown in FIG. 3. The pipeline is divided into lower lanes that are closer to a controller that provides control signaling to the pipeline and upper lanes that are further from the controller so that control signaling takes longer to propagate to the upper lanes than to the lower lanes. Instructions processed in the pipeline are therefore subdivided into lower bits and upper bits that are provided to the lower lanes and upper lanes, respectively. Some of the cycles in the three cycle transfer 600 correspond to some embodiments of the differential processing 400 shown in FIG. 4. Thus, in the interest of clarity, the cycles are labeled cycles 3-8.

At cycle 3, the lower lanes of the pipeline perform a register read (in block 605) to read information that is used to execute the lower bits of the instruction. Although not shown in FIG. 5, the upper lanes of the pipeline read the upper bits of the instruction from the physical register and perform a predecode operation on the upper bits of the instruction.

At cycle 4, the lower lanes of the pipeline execute (in block 610) the lower bits of the instruction. The upper lanes of the pipeline perform a register read (in block 615) to read information that is used to execute the upper bits of the instruction.

At cycle 5, the lower lanes of the pipeline are unable to complete execution because data has not yet been distributed from the upper lanes to the lower lanes. The lower lanes of the pipeline therefore continue to execute (in block 620) the lower bits of the instruction. The upper lanes of the pipeline execute (in block 625) the upper bits of the instruction. The executed upper bits of the instruction include an operation that distributes information from the upper lanes to the lower lanes. Examples of instructions that distribute information include broadcast instructions, bit shift instructions, and the like. The information is distributed from the upper lanes to the lower lanes during cycle 5, as indicated by the arrow 630.

At cycle 6, the lower lanes of the pipeline execute (in block 635) the lower bits of the instruction on the basis of the information that was distributed from the upper lanes in cycle 5. The lower lanes of the pipeline are therefore able to complete execution of the lower bits of the instruction in cycle 6. The upper lanes of the pipeline continue to execute (in block 640) the upper bits of the instruction so that the upper lanes continue to consume and produce one cycle behind the lower lanes. Dependencies therefore line up and no additional hazards are introduced.

At cycle 7, the lower lanes of the pipeline write (at block 645) the results of executing the lower bits of the instruction, e.g., back to the physical register file. The upper lanes of the pipeline continue to execute (in block 650) the upper bits of the instruction so that the upper lanes continue to consume and produce one cycle behind the lower lanes. Dependencies therefore line up and no additional hazards are introduced.

At cycle 8, the upper lanes of the pipeline write (at block 655) the results of executing the upper bits of the instruction, e.g., back to the physical register file. Although not shown in FIG. 6, the lower lanes of the pipeline are able to begin processing of lower bits of a subsequent instruction in cycle 8. Distributing information from upper lanes to lower lanes is therefore a three cycle operation.

Figure 7:
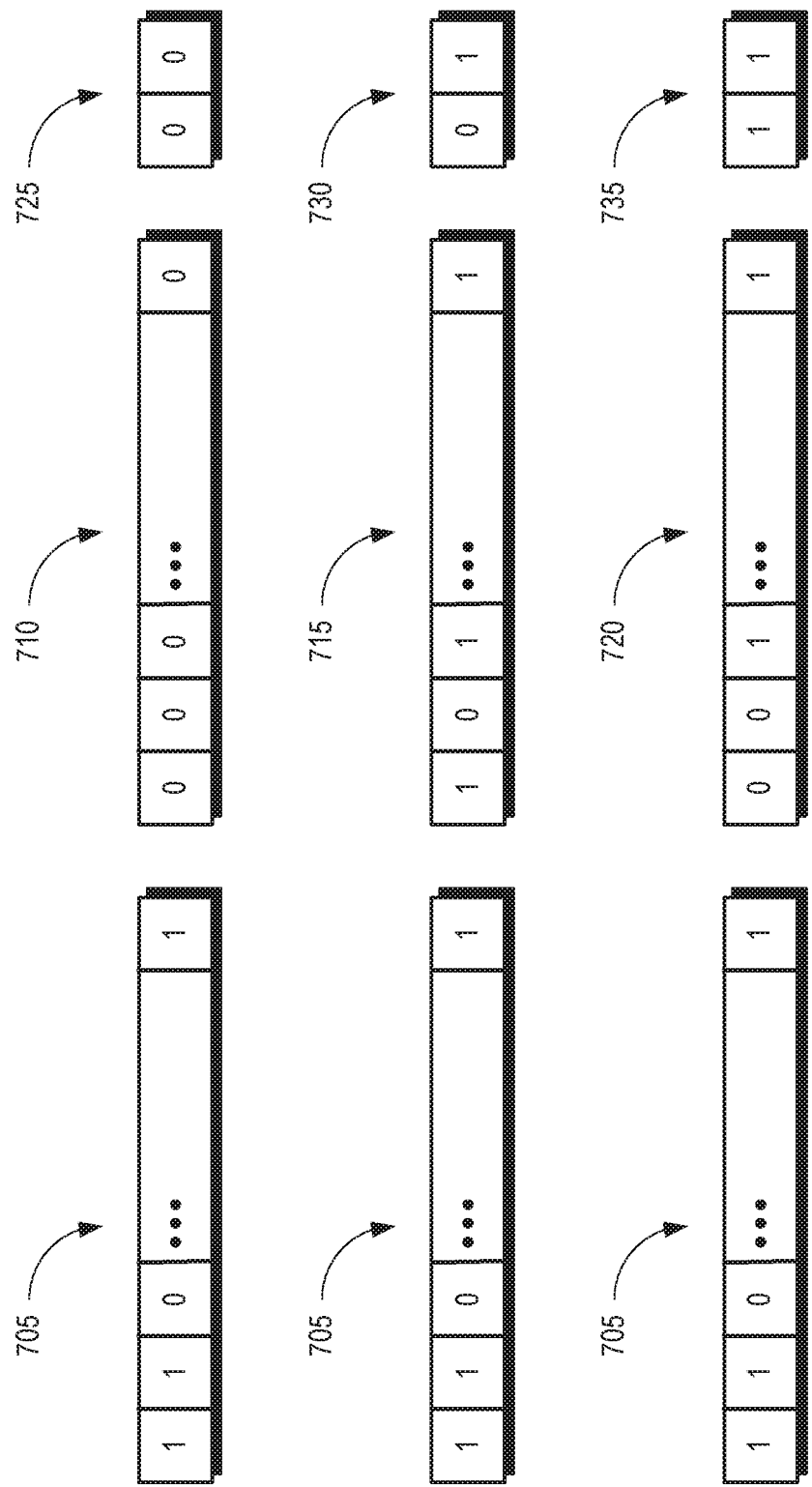
FIG. 7 is a block diagram illustrating instructions that are tagged to indicate a status of upper bits of an instruction according to some embodiments.

FIG. 7 is a block diagram illustrating instructions that are tagged to indicate a status of upper bits of an instruction according to some embodiments. As discussed herein, different pipelines are configured to handle multiple instruction set architectures that map instructions to lower and upper bits in different ways. For example, the values of the lower bits 705 define an instruction such as an addition instruction. The upper bits take on different values depending on the instruction set architecture. The values of the upper bits 710 are set equal to zero, e.g., according to the AVX instruction set architecture, which uses only the lower 128 bits to represent instructions and sets the upper 128 bits equal to zero. The values of the upper bits 715 are determined by the instruction, e.g., according to the AVX2 instruction set architecture, which uses all 256 bits to represent the instructions in the set, regardless of whether the instruction is a 128 bit instruction or a 256 bit instruction. The values of the upper bits 720 are determined by previous values stored in the corresponding register, e.g., according to the SSE instruction set architecture, which uses only the lower 128 bits to represent instructions and leaves the upper 128 bits equal to whatever value they previously held.

Processing of instructions exhibits modal behavior and produces different results when the instructions use less than all of the number of bits supported by the pipeline. Some embodiments of the pipelines 251-254 shown in FIG. 2 and the pipeline 300 shown in FIG. 3 therefore exhibit modal behavior and produce different results depending on whether the upper bits are set equal to zero or merged with a previous value. To address this problem, instructions are tagged with different values to indicate different modes that are used to handle the upper bits of the instruction. In the illustrated embodiment, an operation is defined by lower bits 705 of an instruction and does not necessarily use values of upper bits 710, 715, 720 of the instruction to define the operation. A value of a tag 725 is set to 00 to indicate that the operation uses the lower bits 705 and sets the upper bits 710 to zero. A value of a tag 730 is set to 01 to indicate that the operation uses the lower bits 705 and the upper bits 715. A value of a tag 735 is set to 11 to indicate that the operation uses the lower bits 705 and a merged value of the upper bits 720.

Operation of the pipeline is modified based on the value of the tags 725, 730, 735. For example, the pipeline is configured to execute the lower bits 705 and the upper bits 715 if the value of the tag 730 is set to 01 to indicate that the operation uses the lower bits 705 and the upper bits 715. For another example, the pipeline is configured to execute the lower bits 705 and ignore the upper bits 715 if the value of the tag 735 is set to 11 to indicate that the operation uses the lower bits 705 and a merged value of the upper bits 720. For yet another example, the pipeline is configured to execute the lower bits 705 and bypass storing the upper bits 710 if the value of the tag 725 is set to 00 to indicate that the values of the upper bits 710 are set to zero.

In some embodiments, the apparatus and techniques described above are implemented in a system including one or more integrated circuit (IC) devices (also referred to as integrated circuit packages or microchips), such as the pipelines described above with reference to FIGS. 1-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes are sometimes made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a pipeline comprising a first portion and a second portion;
    a controller configured to provide control signals to the first portion of the pipeline based on a first physical distance traversed by the control signals propagating from the controller to the first portion of the pipeline being shorter than a second physical distance traversed by the control signals propagating from the controller to the second portion of the pipeline; and
    a scheduler configured to cause a first subset of bits of an instruction to be provided to the first portion at a first time and a second subset of bits of the instruction to the second portion at a second time subsequent to the first time, wherein the scheduler is further configured to tag the instruction with a set of bits that indicates whether the second subset of the bits of the instruction is to be executed by the pipeline.

2. The apparatus of claim 1, wherein a propagation time of the control signals from the controller to the first portion of the pipeline is less than a propagation time of the control signals from the controller to the second portion of the pipeline.

3. The apparatus of claim 1, wherein the first time corresponds to a first cycle of execution of the pipeline and the second time corresponds to a second cycle of execution of the pipeline.

4. The apparatus of claim 3, wherein the second cycle is one cycle later than the first cycle.

5. The apparatus of claim 4, wherein the scheduler is configured to dispatch instructions that do not convey information between the first portion and the second portion of the pipeline on average once per cycle with a single cycle latency.

6. The apparatus of claim 5, wherein the scheduler is configured to dispatch instructions that convey information between the first portion and the second portion of the pipeline with a three cycle latency.

7. The apparatus of claim 1, wherein the first subset of bits includes a lower 128 bits of a 256 bit instruction and the second subset of bits includes an upper 128 bits of a 256 bit instruction.

8. The apparatus of claim 1, wherein the set of bits further indicates whether the first subset of the bits of the instruction is to be executed by the pipeline, and wherein the first time is determined based on a propagation time of the control signals from the controller to the first portion of the pipeline and the second time is determined based on a propagation time of the control signals from the controller to the second portion of the pipeline.

9. A method comprising:
    providing, from a physical register file, a first subset of bits of an instruction to a first portion of a pipeline at a first time;
    providing, from the physical register file, a second subset of bits of the instruction to a second portion of the pipeline at a second time subsequent to the first time;
    tagging the instruction with a set of bits that indicates whether the second subset of the bits of the instruction is to be executed by the pipeline; and
    providing, from a controller, control signals to the first portion of the pipeline based on a first physical distance traversed by the control signals propagating from the controller to the first portion of the pipeline is shorter than a second physical distance traversed by the control signals propagating from the controller to the second portion of the pipeline.

10. The method of claim 9, wherein a propagation time of the control signals from the controller to the first portion of the pipeline is less than a propagation time of the control signals from the controller to the second portion of the pipeline.

11. The method of claim 9, wherein providing the first subset of bits at the first time comprises providing the first subset of bits during a first cycle of execution of the pipeline, and wherein providing the second subset of bits at the second time comprises providing the second subset of bits during a second cycle of execution of the pipeline.

12. The method of claim 11, wherein providing the second subset of bits during the second cycle comprises providing the second subset of bits one cycle later than the first cycle.

13. The method of claim 11, further comprising:
    dispatching instructions that do not convey information between the first portion and the second portion of the pipeline on average once per cycle with a single cycle latency.

14. The method of claim 11, further comprising:
    dispatching instructions that convey information between the first portion and the second portion of the pipeline with a three cycle latency.

15. The method of claim 9, wherein the first subset of bits includes a lower 128 bits of a 256 bit instruction and the second subset of bits includes an upper 128 bits of a 256 bit instruction.

16. The method of claim 9, wherein the set of bits further indicates whether the first subset of the bits of the instruction is to be executed by the pipeline.

17. A method comprising:
    providing, from a physical register file, a first subset of bits of an instruction to a first portion of a pipeline;
    delaying provision of a second subset of bits of the instruction from the physical register file to a second portion of the pipeline by a time interval that is determined based on a difference between a first physical distance traversed by control signals propagating from a controller to the first portion of the pipeline and a second physical distance traversed by the control signals propagating from the controller to the second portion of the pipeline; and
    tagging the instruction with a set of bits that indicates whether the second subset of the bits of the instruction is to be executed by the pipeline.

18. The method of claim 17, wherein providing the first subset of bits of the instruction comprises providing the first subset of bits of the instruction during a first cycle, and wherein delaying provision of the second subset of bits comprises delaying provision of the second subset of bits by one cycle.

19. The method of claim 17, further comprising:
    dispatching instructions that do not convey information between the first portion and the second portion of the pipeline on average once per cycle with a single cycle latency; and
    dispatching instructions that convey information between the first portion and the second portion of the pipeline with a three cycle latency.

20. The method of claim 17, wherein the set of bits further indicates whether the first subset of the bits of the instruction is to be executed by the pipeline.

* * * * *